United States Patent Office 3,548,224
Patented Dec. 15, 1970

3,548,224
BRUSHLESS DIRECT-CURRENT MOTOR WITH GALVANOMAGNETIC COMMUTATION
Werner Dittrich and Reiner Kristen, Nuremberg, Germany, assignors to Siemens Aktiengesellschaft, Munich, Germany, a corporation of Germany
Filed Apr. 7, 1969, Ser. No. 814,016
Claims priority, application Germany, Mar. 8, 1969, 1,911,836
Int. Cl. H02k
U.S. Cl. 310—10                               10 Claims

ABSTRACT OF THE DISCLOSURE

The stator of a brushless direct-current motor, preferably of the midget type, comprises a drum-shaped coil support coaxially surrounding a permanent-magnet rotor, the stator windings being mounted on the coil support and surrounded by the stator yoke structure constituted by a stack of annular laminations. A carrier structure coaxially situated at one side of the stator carries galvanomagnetic members, such as Hall probes, which are responsive to the magnetic field of the rotor for controlling the commutation of the motor circuit. The drum-shaped coil support has a tubular extension coaxially surrounding the rotor shaft and protruding along the shaft toward the carrier. The extension and the carrier are in positive locking engagement with each other by means of a latch-and-catch configuration which holds the carrier with the galvanomagnetic members in a fixed position relative to the stator.

SPECIFICATION

Our invention relates to brushless direct-current motors, preferably of the midget type, with galvanomagnetic commutation control means, and more specifically to a motor whose shaft carries a permanent-magnet rotor and whose stator is equipped with a drum-shaped coil support surrounding the rotor, the stator windings being mounted on the support and surrounded by an annular yoke structure which is joined with the carrier of the galvanomagnetic control means and is insertable into a tubular housing. In a known brushless direct-current miniature motor of this type, the armature windings are composed of four star-connected winding portions whose free ends are in connection with one pole of the direct-voltage supply means through the collector-emitter paths of four transistors respectively, whereas the common star point of the four winding portions is connected to the other pole. Each two transistors are conjointly controlled by a Hall probe spacially displaced 90° relative to the appertaining winding portions, the Hall voltage output terminals of each of the two Hall probes being connected with the bases of the two appertaining transistors. The permanent-magnet rotor is diagnonally magnetized and has only one north pole and one south pole. A motor with a commutation control circuit of this type is illustrated and described, for example, in U.S. application Ser. No. 634,212 (F–3578), of Julius Brunner and Erich Rainer, filed Apr. 27, 1967, for Brushless Direct-Current Motor with Hall-Generator Control. In the known motor, the two Hall probes are mounted in respective recesses at the inner periphery of the annular stator yoke. For increasing the amount of magnetic flux acting upon the Hall probes, the probes are further provided with catch sheet members of magnetizable high-permeability material. For accurately fixing the position of the stator winding to the carrier of the galvanomagnetic members and relative to the bearing shield of the motor, the coil support of the stator is provided on both axial sides with extensions which pass into corresponding central openings of the respective bearing shields. Such a motor design has been found advantageous if, for securing a small axial length of the motor, the bearings for the motor shaft are arranged within the coil support.

While reference is made in the foregoing to galvanomagnetic means constituted by Hall probes, it will be understood that they may be substituted by other galvanomagnetic devices, i.e. electrical solid-state components that vary a resistance, voltage or current in response to variations of an electric field acting upon the galvanomagnetic device. Such other devices comprise galvanomagnetic resistors, commercially known as field plates, and galvanomagnetic p-n junction diodes. An example of a motor with commutation control by such galvanomagnetic resistors or field plates is described in U.S. application Ser. No. 782,902 of Jurgen Wenk, filed Dec. 11, 1968, for Commutating Circuit for A Commutatorless DC Miniature Motor (F–3953).

It is an object of our invention to devise brushless direct-current motors, preferably for midget-type sizes, which operate with galvanomagnetic commutation control but are simpler in design than those heretofore known, while affording more freedom as to the arrangement of the motor bearings.

Another object of our invention is to provide a particularly rugged and climatically insensitive motor which is applicable with extremely high or abrupt current surges such as with intermittent current waves having steep wave fronts and high amplitudes.

According to the invention, we fasten the carrier of the galvanomagnetic control members to a tubular extension of the drum-shaped coil support, the extension protruding from the support around and along the rotor shaft toward and into engagement with the carrier and forming together therewith a positive locking engagement. Due to such shape-constrained fastening of the carrier to the tubular extension of the coil support, the carrier and the galvanomagnetic members fastened thereto are held in a fixed position relative to the stator. Preferably, the tubular extension of the coil support and the carrier of the galvanomagnetic members are provided with mutually engageable latch-and-catch configurations in such a manner that neither a relative rotation nor an axial displacement between the two parts is possible.

According to a further feature of the invention, the Hall probes or other galvanomagnetic members are mounted on the front side of the rotor, and ferromagnetic sheet members are provided for supplying the probes with stray flux from the permanent-magnet rotor. According to another, preferred feature of the invention, each of the probes is provided with two such sheet members, namely a flux collector member and a yoke member, both of magnetizable high-permeability material, and these are arranged at the front side of the permanent-magnet rotor in a diametrical plane and in concentric relation to the rotor shaft, the two sheet members for each Hall probe being located diametrically opposite each other. The yoke sheet members for the Hall generators are further magnetically connected with each other, preferably by a ferromagnetic yoke ring which extends coaxially around the rotor shaft.

According to still another feature of the invention, the coil support with the stator winding and the carrier of the galvanomagnetic members are firmly joined by a casting mass to form a single accurately dimensioned structural unit which is insertable into the magnetic yoke structure of the stator in intimately fitting relation thereto. In this manner, the resulting motor is made particularly rugged, insensitive to changes in temperature and humidity, and resistant to extremely high current loads.

The invention will be further described with reference to two embodiments of motors according to the invention illustrated by way of example on the accompanying drawings, in which FIGS. 1 through 7 relate to one embodiment, and FIGS. 8 and 9 to the other embodiment. More specifically:

Figure 2:
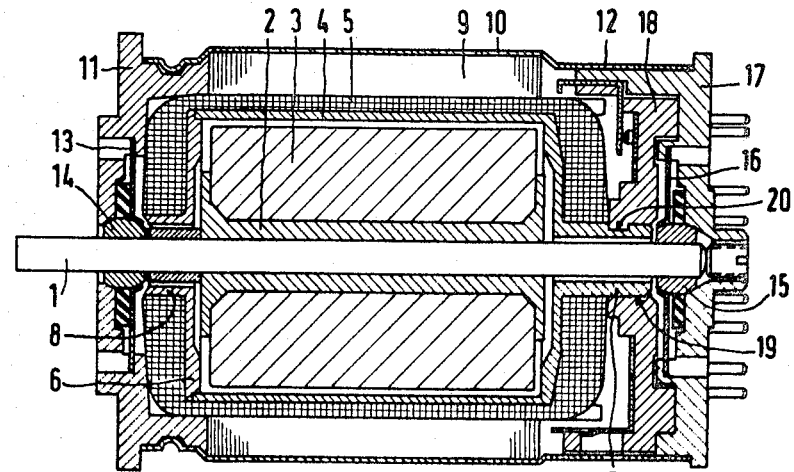
FIG. 2 is a section along the diagonal line II—II in FIG. 1.
Figure 1:
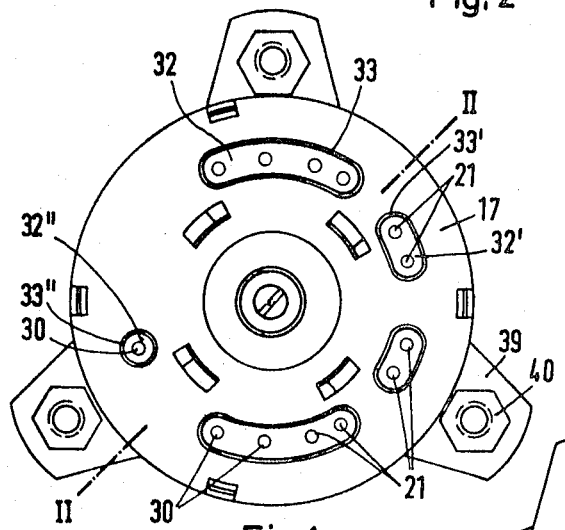
FIG. 1 shows a motor by a view onto the terminal side thereof.
Figure 3:
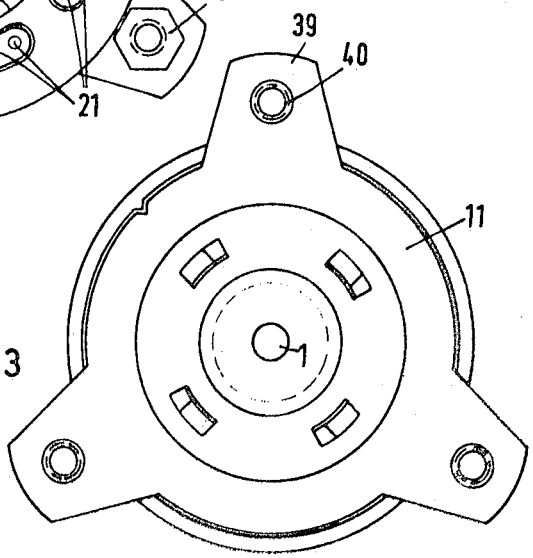
FIG. 3 is a view of the motor from the take-off side of the motor shaft.

Referring mainly to FIGS. 1 to 3, there is shown a rotor shaft 1 on which a ring-shaped structure 3 consisting of a diagonally magnetized permanent magnet is fastened with the aid of a nonmagnetic casting mass 2 which may consist of insulating material or nonmagnetic metal. The rotor 3 is surrounded by a coil support or spool 4 which carries a four-part stator winding 2. The four individual parts of the winding 5 and their circuit connections are not further illustrated herein because they may correspond to the above-mentioned U.S. application Ser. No. 634,212.

Figure 6:
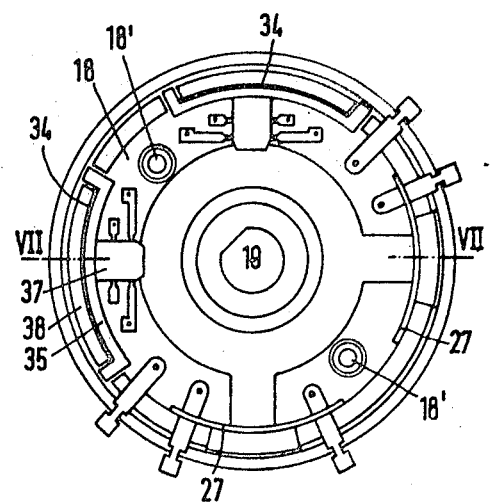
FIG. 6 shows the carrier of FIG. 4 together with the bearing shield fastened upon the carrier.

The coil support 4 consists of a bell-shaped main portion and a cover portion 6. Both are provided with tubular extensions 7 and 8 concentrically surrounding the shaft 1 and traversed by the rotor shaft. The stator winding 5 is surrounded by the magnetic yoke structure of the stator. This yoke is constituted by a stack of annular punched laminations held together by the correspondingly formed housing or can 10 of the motor. The forming of the can 10 is preferably effected with the aid of a magnetic pulse-forming or another high-speed metal-forming process. When thus assembling and securing the magnetic yoke structure in the can 10, a bearing shield 11 on the take-off side and a centering neck 12 for a bearing shield 17 at the terminal side of the motor are simultaneously produced. A calotte-type bearing 14 is fastened in the bearing shield 11 with the aid of a spring sheet member 13. The other bearing 15 of the motor is fastened in the bearing shield 17 with the aid of another spring sheet member 16, and the shield 17 is inserted into the centering neck 12 of the can 10. A carrier 18 made of nonmagnetic material, such as insulating synthetic plastic, is joined with the bearing shield 17 in any suitable manner, for example by the illustrated tubular rivets 18' (FIG. 6). The carrier 18 has a central bore 19 (FIGS. 4 and 5) which corresponds in diameter to the tubular extension 7 of the winding support 4 but does not extend entirely straight through the carrier 18 so as to leave a nose or latch portion 20 which catches into a corresponding recess in the tubular extension 7, thus securing the carrier in a fixed position relative to the stator winding.

Figure 4:
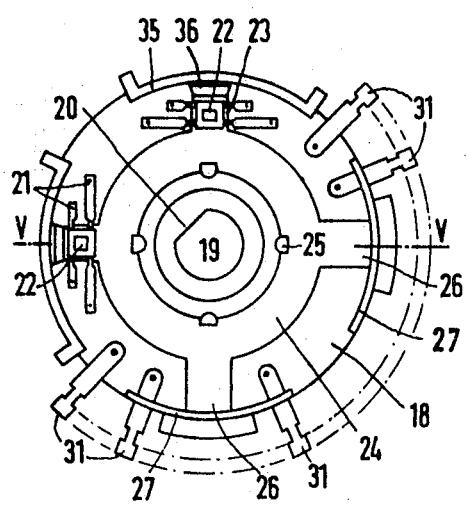
FIG. 4 is a view into the interior of the carrier of the galvanomagnetic members and terminals of the motor.
Figure 5:
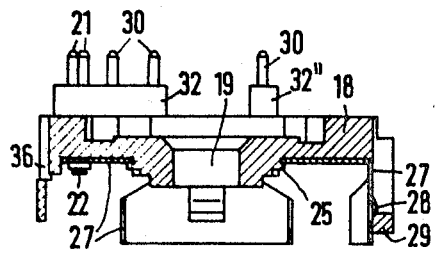
FIG. 5 is a section along the line V—V in FIG. 4.

The design of the carrier 18 is more fully apparent from FIGS. 4 and 5. Connector pins 21 for Hall probes 22 are injection-molded into the carrier 18 and are angularly displaced 90° at the front side of the carrier 18 facing the winding and rotor. The Hall probes 22 are mounted upon radial extensions 23 of a ferromagnetic yoke ring 24 which is fastened in the interior of the carrier 18 with the aid of noses shaped out of the material of the carrier 18, preferably by hot-molding. The ferromagnetic yoke ring 24 is connected through bridges 26 with yoke sheet members 27 which have an angular shape, one leg of each of these members extending parallel to the axis of the motor. The members 27 thus are in magnetically conducting connection with the ring 24. Respective noses 28 are cut and pressed out of the yoke sheet members 27 and catch behind extensions 29 integrally molded of the material of the carrier 18. Connector plug pins 30 are connected to the stator winding through respective lugs 31. The connecting lugs 31 are shown radially in FIG. 4. However, when mounting the carrier, the lugs are bent in directions parallel to the axis. The connector pins 21 and 30 are surrounded by collars which can be tightly inserted into corresponding openings 33 (FIG. 1) of the bearing shield 17, whereafter the connector plug pins 21 and 30 are accessible from the outside of the fully assembled motor.

Figure 7:
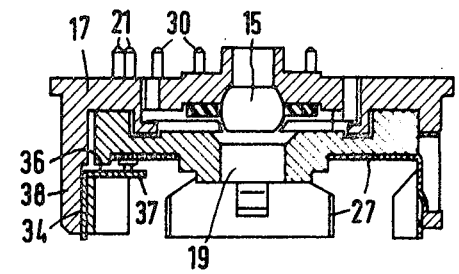
FIG. 7 is a section along the line VII—VII in FIG. 6.

Located diametrically opposite the yoke sheet member 27 are further ferromagnetic sheet members 34 which, for distinction, are herein called flux collector members. The collector members (FIGS. 6 and 7) are placed behind arcuate projections 35 of the terminal carrier 18. The radially bent legs 37 of the collector members 34 are stuck through openings 36, and are in area contact with the top side of the Hall probes. The catch sheet members 34 are positively held in position by collars 38 which are integrally shaped of the material of the bearing shield 17. The collector members 34 conduct stray flux from the permanent-magnet rotor 3 and conduct this flux through the Hall probes 22 to the yoke ring 24 from which the flux passes through the yoke sheet members 27 back to the permanent-magnet rotor.

As shown in FIGS. 1 and 3, the bearing shield 11 has three radially protruding feet 39 with embedded screw nuts 40 to permit mounting the motor on a panel or other supporting structure.

Figure 8:
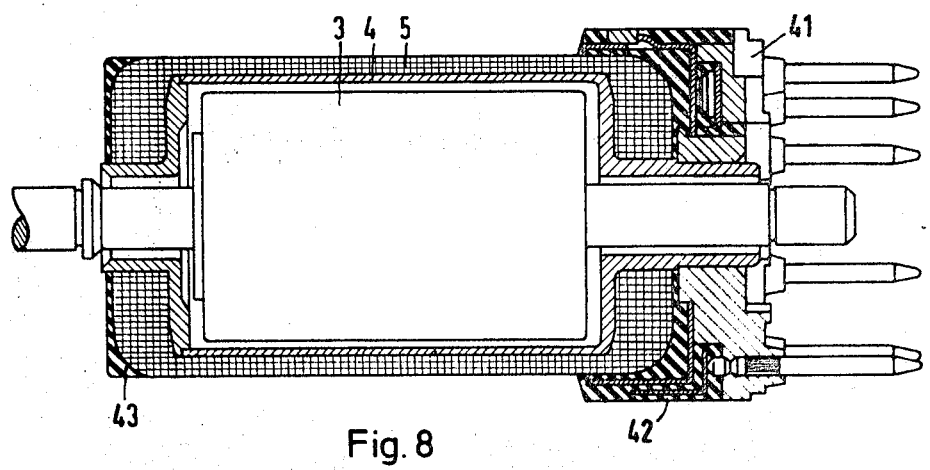
FIG. 8 illustrates in longitudinal section an embodiment of a motor in which the carrier of the galvanomagnetic members and of the terminals is combined with the coil carrier and the winding of the motor so that these components form a single structural unit and are held together by casting resin or the like embedding and casting material.
Figure 9:
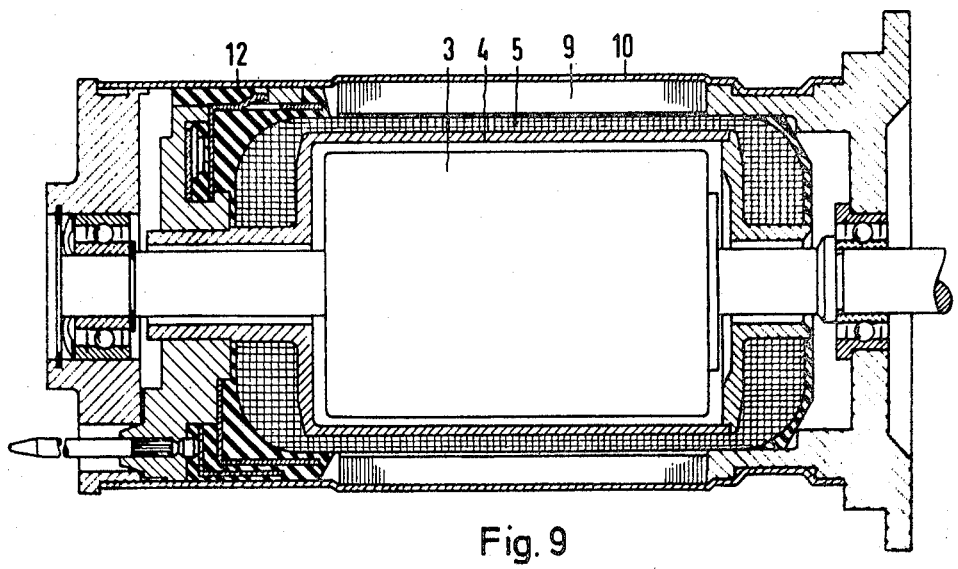
FIG. 9 is a longitudinal section through a complete motor equipped with the unit shown in FIG. 8.

FIGS. 8 and 9 show a modified embodiment corresponding largely to the one described with reference to FIGS. 1 to 6, identical components being denoted by the same reference numerals respectively. According to FIG. 8, a carrier 41 for the galvanomagnetic members and the connector terminals is designed substantially in the same manner as the carrier 18 described above. In order to secure complete insensitivity to changes in climatic conditions and also for increasing the resistance to impact of electrical or mechanical nature, the coil carrier 4, the stator winding 5 and the carrier 41 are bonded together with the aid of casting resin or other nonmagnetic and electrically insulating casting mass so as to form a single block structure. The casting masses used for this purpose are denoted in FIG. 8 by 42 and 43. The block is molded to accurate dimensions and is preferably inserted directly into the magnetic yoke structure 9 and the centering neck 12 of the housing 10, this being apparent from FIG. 9.

Details of the Hall probes and of the external circuitry connecting the probes with the stator windings are not shown and described herein because they need not depart from those fully illustrated and described in the copending application Ser. No. 634,212, mentioned above. When substituting the Hall probes by field plates or other two-terminal galvanomagnetic resistors, the number of connector members may be reduced by comparison with the four-pole probes, and the circuitry may correspond, for example, to the one described in the above-mentioned copending application Ser. No. 782,902.

Upon a study of this disclosure, it will be obvious to those skilled in the art that our invention permits of various modifications and may be given embodiments other than those illustrated and described herein, without departing from the essential features of the invention and within the scope of the claims annexed hereto.

We claim:

1. A brushless direct-current motor with galvanomagnetic commutation, comprising a motor shaft and a permanent-magnet rotor fixed on said shaft, a stator having a drum-shaped coil support coaxially surrounding said rotor and having stator windings mounted on said support and a magnetizable annular yoke structure surrounding said windings, galvanomagnetic commutation control members, a carrier coaxially situated at one axial end of said stator and carrying said galvanomagnetic members, said drum-shaped coil support having a tubular extension coaxially surrounding said shaft and protruding along said shaft toward and into engagement with said carrier, said tubular extension and said carrier forming with each other a positive locking engagement which holds said carrier with said galvanomagnetic members in a fixed position relative to said stator.

2. In a motor according to claim 1, said carrier and said tubular extension of said coil support forming respective latch-and-catch means which conjointly constitute said positive locking engagement.

3. In a motor according to claim 1, said galvanomagnetic members being respective Hall probes and being mounted on said carrier beside said rotor, and ferromagnetic flux collector sheet members extending from near the periphery of said rotor to said Hall probes for conducting magnetic stray flux from said rotor through said Hall probes.

4. In a motor according to claim 1, said galvanomagnetic members comprising two Hall probes angularly spaced from each other and mounted on said carrier beside said rotor, two pairs of ferromagnetic sheet members extending from near the periphery of said rotor to opposite sides respectively of each of said Hall probes for conducting magnetic stray flux from said rotor through said Hall probes, the two ferromagnetic sheet members of each of said two pairs extending in a substantially diametrical plane of said shaft and being located diametrically opposite each other.

5. A motor according to claim 4 comprising a ferromagnetic yoke ring located near the adjacent axial end of said rotor, one of said sheet members of each of said pairs being magnetically joined with said yoke ring whereby said joined members are interconnected magnetically by said ring to form part of a yoke common to said Hall probes.

6. In a motor according to claim 4, said carrier having extensions protruding toward said rotor in directions parallel to the rotor axis, and said sheet members being fixed on said extensions.

7. A motor according to claim 6, comprising a bearing shield in which said shaft is journalled and which is coaxially assembled with said carrier, at least one of said shield and carrier having extensions protruding toward said rotor in directions parallel to the rotor axis, and said sheet members being fixed on said extension.

8. In a motor according to claim 1, said carrier comprising terminal members integrally molded together with said carrier.

9. In a motor according to claim 7, said carrier comprising terminal members integrally molded together with said carrier, said carrier having an arcuate projection common to correlated ones of said terminal members, and said bearing shield having an opening traversed by said projections, whereby said terminal members are accessible at the outside of said shield structure.

10. A motor according to claim 1, comprising an insulating casting mass rigidly joining said coil support with said stator windings and said carrier to a unit dimensioned to be tightly fitted into the surrounding stator yoke structure.

References Cited
UNITED STATES PATENTS

| | | | |
|---|---|---|---|
| 3,204,165 | 8/1965 | Kreutzer | 318—138 |
| 3,230,434 | 1/1966 | Bauerlein | 318—138 |

DAVID X. SLINEY, Primary Examiner

U.S. Cl. X.R.

310—46, 219